(12) United States Patent
Steele et al.

(10) Patent No.: US 7,833,642 B2
(45) Date of Patent: Nov. 16, 2010

(54) FORMING AN IMPERMEABLE SINTERED CERAMIC ELECTROLYTE LAYER ON A METALLIC FOIL SUBSTRATE FOR SOLID OXIDE FUEL CELL

(75) Inventors: Brian Charles Hilton Steele, Surrey (GB); Alan Atkinson, Oxon (GB); John Anthony Kilner, Surrey (GB); Nigel Peter Brandon, Surrey (GB); Robert Arthur Rudkin, Essex (GB); Naoki Oishi, London (GB)

(73) Assignee: Ceres Intellectual Property Company Limited, Crawley (GB)

( * ) Notice: Subject to any disclaimer, the term of this patent is extended or adjusted under 35 U.S.C. 154(b) by 1833 days.

(21) Appl. No.: 10/382,471

(22) Filed: Mar. 6, 2003

(65) Prior Publication Data
US 2003/0224234 A1 Dec. 4, 2003

(30) Foreign Application Priority Data
Mar. 6, 2002 (GB) .................................. 0205291.8

(51) Int. Cl.
*H01M 8/10* (2006.01)
(52) U.S. Cl. .............................. 429/30; 429/40; 429/41; 429/44; 429/45
(58) Field of Classification Search .................. 429/30, 429/40, 45, 41, 44
See application file for complete search history.

(56) References Cited

U.S. PATENT DOCUMENTS

| | | | |
|---|---|---|---|
| 3,985,576 A | 10/1976 | Lingscheit et al. | |
| 4,263,381 A * | 4/1981 | McEntire et al. | 429/320 |
| 5,527,633 A | 6/1996 | Kawasaki et al. | |
| 5,624,542 A * | 4/1997 | Shen et al. | 204/283 |
| 5,686,198 A | 11/1997 | Kuo et al. | |
| 6,093,297 A | 7/2000 | Tomura et al. | |
| 6,605,316 B1 * | 8/2003 | Visco et al. | 427/115 |
| 6,767,662 B2 * | 7/2004 | Jacobson et al. | 429/30 |
| 6,794,075 B2 * | 9/2004 | Steele et al. | 429/30 |

FOREIGN PATENT DOCUMENTS

| | | |
|---|---|---|
| EP | 0 230 976 | 8/1987 |
| EP | 0 316 143 | 5/1989 |
| EP | 0 713 931 | 5/1996 |

(Continued)

OTHER PUBLICATIONS

Ralph et a (Evaluation of Potential Cathode Materials for SOFC Operation Between 500-800 degrees Celsius, Electrochemical Society Proceedings, vol. 2001-16, p. 466-475).*

(Continued)

*Primary Examiner*—Patrick Ryan
*Assistant Examiner*—Ben Lewis
(74) *Attorney, Agent, or Firm*—Nixon & Vanderhye P.C.

(57) ABSTRACT

An impermeable sintered ceramic electrolyte layer of a solid oxide fuel cell is formed by depositing ceramic powder on a substrate using electrophoretic deposition, isostatically pressing that deposited ceramic layer and then heating the compressed ceramic powder layer at temperatures below 1000° C. In preferred embodiments the ceramic thick film fuel cell assembly is formed upon a ferritic stainless steel substrate.

25 Claims, 3 Drawing Sheets

FOREIGN PATENT DOCUMENTS

Figure 1:
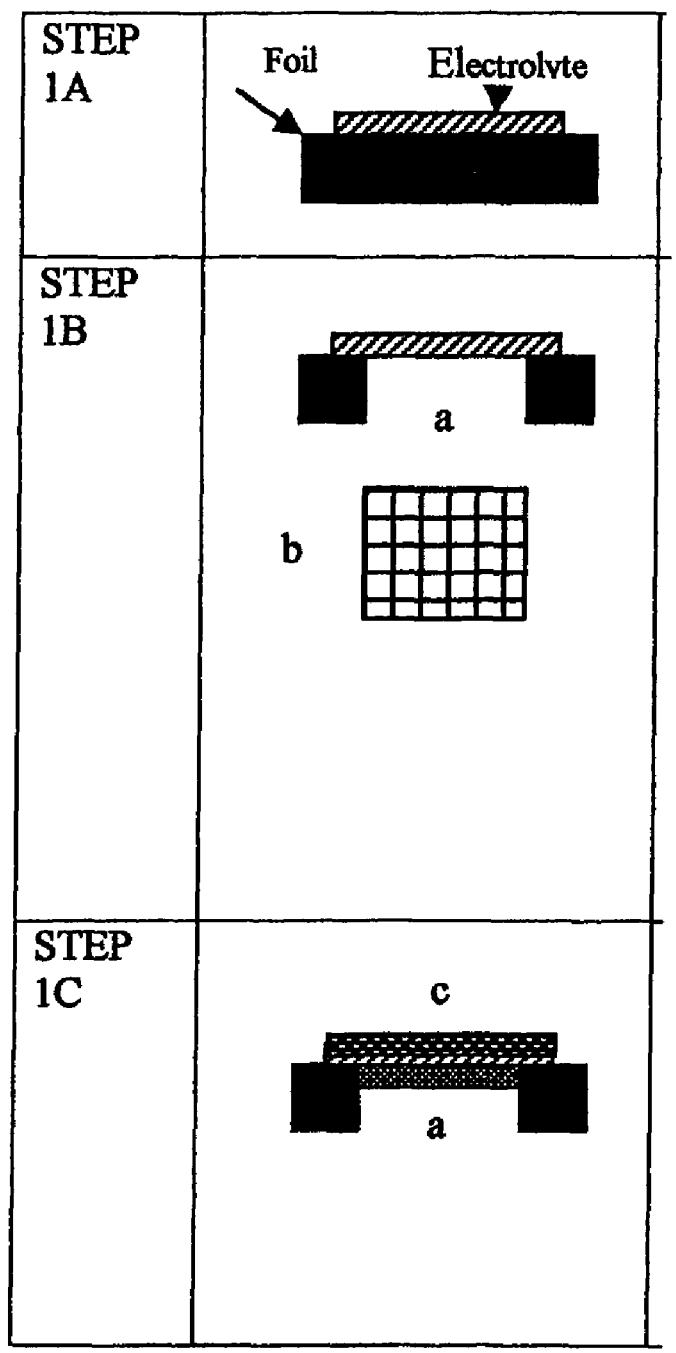

| | | |
|---|---|---|
| GB | 1 049 428 | 11/1966 |
| GB | 1 241 559 | 8/1971 |
| GB | 2 157 486 | 10/1985 |
| JP | 48-40808 | 6/1973 |
| JP | 10-102294 | 4/1998 |
| WO | WO 97/03233 | 1/1997 |
| WO | WO 01/09968 | 2/2001 |
| WO | WO 02/35628 | 5/2002 |

OTHER PUBLICATIONS

AK Steel Corporation, Product Data Bulletin 441 Stainless Steel, (UNS 144100) Preliminary Bulletin, 441-B-11-01-99, Jul. 2000.*

Y. Du et al, "Fabrication of Tubular Electrolytes for Solid Oxide Fuel Cells Using Strontium- and Magnesium-doped $LaGaO_3$ Materials" *Journal of the European Ceramic Society*, vol. 21, No. 6, Jun. 2001, pp. 727-735.

B.C.H. Steele, "Materials for IT-SOFC Stacks—35 Years R&D: the Inevitability of Gradualness?" *Solid State Ionics*, vol. 134, No. 1-2, pp. 3-20.

J.M. Ralph, et al, "Evaluation of Potential Cathode Materials for SOFC Operation Between 500-800°C" *Electrochemical Society Proceedings*, vol. 2001-16, pp. 466-475.

"Metals Handbook" $10^{th}$ edition, 1990, p. 931.

C.G. Wegst, "Stahlschlussel, 19. Auflage" 2001, p. 350.

* cited by examiner

FORMING AN IMPERMEABLE SINTERED CERAMIC ELECTROLYTE LAYER ON A METALLIC FOIL SUBSTRATE FOR SOLID OXIDE FUEL CELL

This invention relates to the field of forming impermeable ceramic electrolyte layers. More particularly, this invention relates to the field of forming sintered impermeable ceramic layers for solid oxide fuel cells.

PCT International Publication Number WO 02/35628 A1 describes the advantages of using conventional cheap ceramic processing routes to fabricate arrays of solid oxide fuel cells (SOFC) on stainless steel substrates. Alternative fabrication routes involving the use of plasma spraying processes (e.g. GB-A-1049428), vacuum sputtering/evaporation methods (Ref 1), and chemical vapour deposition (CVD) routes (Ref 2), are significantly more expensive. However conventional ceramic processing routes, involving deposition of the relevant ceramic powders and development of the relevant microstructure by sintering at elevated temperatures, are not straightforward because of the associated shrinkages of the deposited powders and limitations due to constraints in the maximum allowable sintering temperatures. For example, temperature constraints may be introduced by the use of stainless steel substrates; to avoid degradation in the properties of stainless steel substrates the maximum sintering temperature is typically restricted to around 1000° C.

Furthermore, the problems associated with obtaining dense oxide coatings on metallic substrates are recognised in the literature. Shrinkage of the deposited powder during sintering can generate very large stresses which can exceed the fracture strength of the ceramic resulting in cracking of the coating. Alternatively, the stresses can sometimes be accommodated by bending of the metallic substrate, but this is undesirable in many contexts. The degree of bending depends upon the stiffness of the substrate. One way of reducing the shrinkage is to introduce a metal powder. The volume expansion associated with the formation of the metal oxide can compensate to some extent for the sintering shrinkage. Examples include the reaction bonding of $Al_2O_3$ coatings (Ref 3) using $Al/Al_2O_3$ powder mixtures, and the formation of mullite coatings (Ref 4) involving the addition of Si powder to alumina-silica materials. However the presence of alumina, or silica containing phases in a ceria-based electrolyte, particularly at grain boundaries, would reduce the ionic conductivity, and the power density of the SOFC stack.

Viewed from one aspect the present invention provides a method of forming a sintered impermeable ceramic electrolyte layer of a solid oxide fuel cell, said method comprising the steps of:

depositing a ceramic electrolyte powder onto a substrate using electrophoretic deposition to form a deposited ceramic powder layer;

isostatically pressing said deposited ceramic layer to form a compressed ceramic powder layer; and heating said compressed ceramic powder layer to sinter said compressed ceramic powder to form said sintered impermeable ceramic layer upon said substrate.

The invention recognises that electrophoretic deposition followed by isostatic pressing can form a compressed ceramic powder layer of sufficient density that when sintered this has desirable properties. These properties include, for example, high density (e.g. >96% theoretical density) so that the sintered electrolyte film is essentially impermeable to the air and fuel gases supplied to the SOFC stack. Moreover the impermeable sintered electrolyte film should preferably have an area specific resistivity (ASR) lower than around 0.5 ohm $cm^2$ to ensure that high power densities can be generated by the fuel cell. For example, the sintered ceramic layer may be subject to a reduced level of linear shrinkage and may be generated using a temperature sufficiently low to avoid damaging other elements within the system.

Whilst the substrate upon which the sintered ceramic layer is formed could take a variety of forms, the invention is particularly useful in situations in which the substrate is a stainless steel foil, particularly ferritic stainless steel, such as European designation 1.4509. Such stainless steels are highly desirable for their other properties for use within solid oxide fuel cells, but are subject to temperature constraints if they are not to be degraded by the sintering of a ceramic layer deposited on top of them.

In preferred embodiments the compressed ceramic powder layer is heated to a temperature of less than 1100° C. and preferably to a temperature less than 1000° C. Such heating desirably takes place within an inert atmosphere, such as Argon gas, or a gas mixture (e.g. $CO_2/H_2$) designed to impose an appropriate oxygen partial pressure within the sintering furnace.

The isostatic pressing step in preferred embodiments applies a pressure of between 100 and 500 MPa. The isostatic pressing advantageously uses a wet-bag isostatic press.

Whilst the sintered ceramic layer being generated could be one of a variety of different layers within a solid oxide fuel cell being produced, the sintered ceramic layer is preferably an impermeable electrolyte layer such as a CGO electrolyte layer, or more preferably a $Ce_{0.9}Gd_{0.1}O_{1.95}$ layer.

In preferred embodiments of the invention the sintered ceramic layer and the substrate are chosen to have substantially the same co-efficient of thermal expansion. In this way, thermally induced stresses during temperature cycling of the solid oxide fuel cell may be reduced.

The electrophoretic deposition and isostatic pressing techniques permit preferred embodiments of the invention to be produced in which the ceramic powder is substantially free from metal powder and substantially free from organic binders or plasticizers.

The present technique is particularly well suited for use in embodiments in which the substrate is, or will be processed to form a perforated metal foil providing support for the sintered ceramic layer whilst allowing gas to flow through the metal foil to the sintered ceramic layer.

Whilst it will be appreciated that the sintered ceramic layer may be formed on a metal substrate, it may alternatively be formed on a porous intermediate layer, such as a ceramic electrode layer. In some preferred embodiments the ceramic electrode layer is a ceramic anode layer formed of NiO/CGO powder and sintered in a reducing atmosphere below 1000° C.

In further preferred embodiments the porous ceramic intermediate electrode layer may be a ceramic cathode layer formed of $Gd_{1-x}Sr_xCoO_3$/CGO powder and fired at a temperature of between 700 and 800° C.

It has been found that sintered impermeable ceramic layers having particularly desirable properties are produced when the compressed ceramic powder layer is formed to have a density 55-60% of the theoretical density.

Another aspect of this invention provides a solid oxide fuel cell including a sintered impermeable ceramic layer formed in accordance with the above described techniques.

Embodiments of the invention will now be described, by way of example only, with reference to the accompanying drawings in which:

FIG. 1 schematically illustrates the formation of a solid oxide fuel cell in accordance with a first embodiment.

Figure 2:
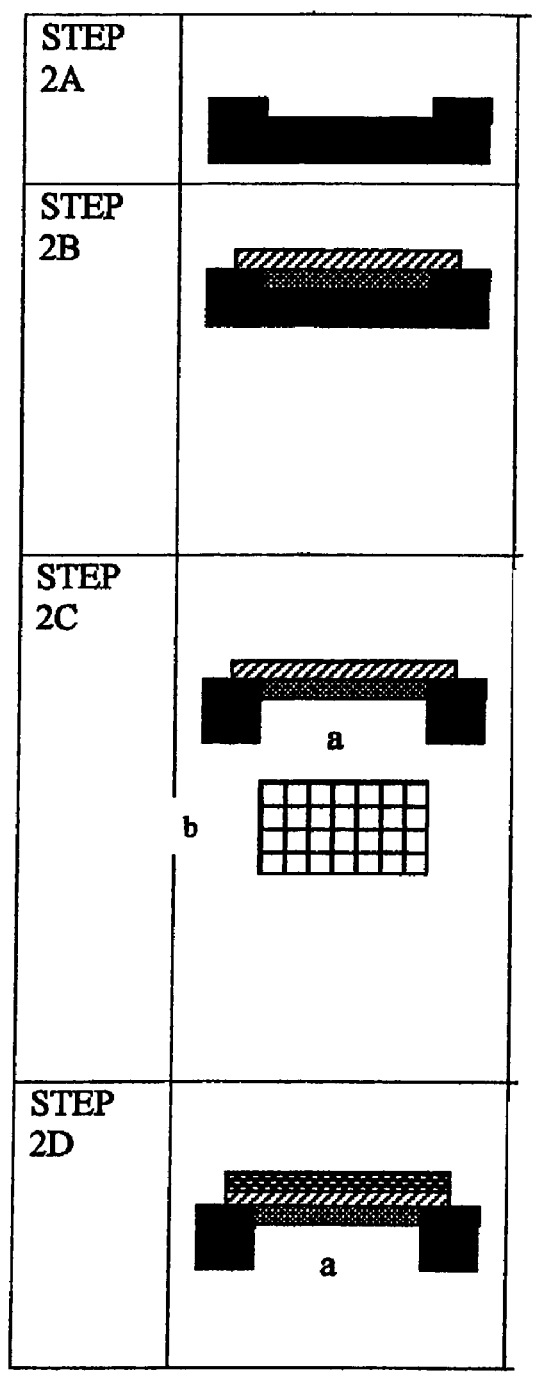

FIG. 2 schematically illustrates the formation of a solid oxide fuel cell in accordance with a second embodiment.

Figure 3:
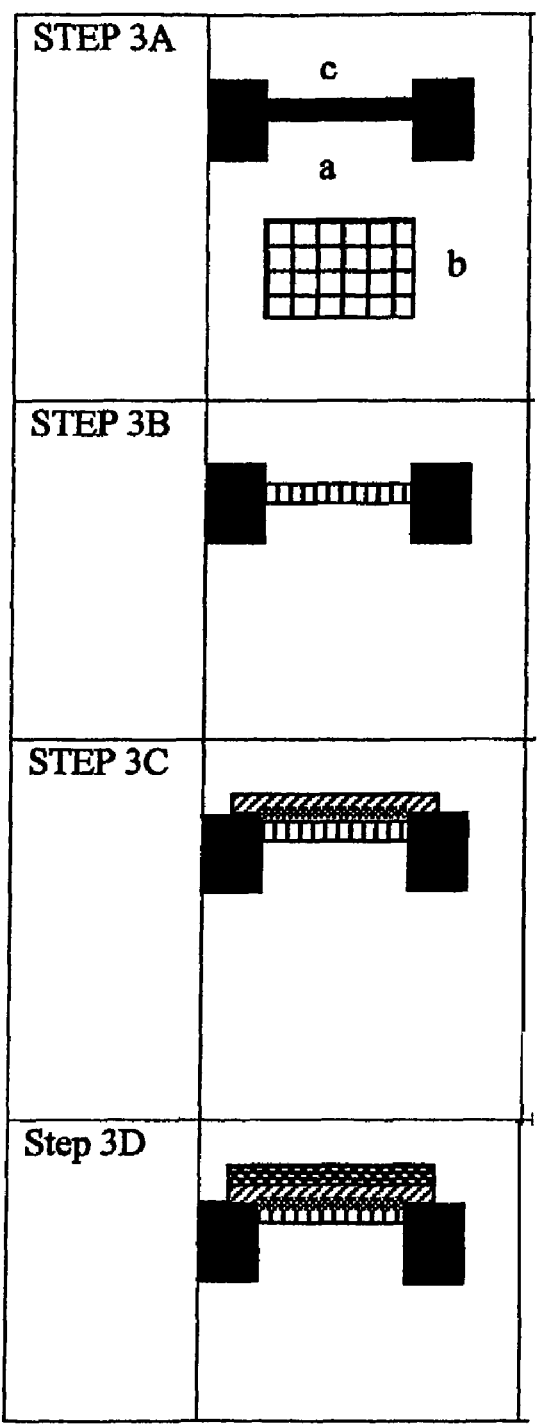

FIG. 3 schematically illustrates the formation of a solid oxide fuel cell in accordance with a second embodiment.

The following describes procedures for addressing the difficulties previously discussed using the materials and structures similar to those specified in PCT International Publication Number WO 02/35628 A1, which include a ferritic stainless steel foil (e.g. European designation 1.4509), and a ceria based ceramic electrolyte (e.g. $Ce_{0.9}GD_{0.1}O_{1.95}$). These materials were selected on account of their excellent coefficient of thermal expansion compatibility (both around $12.5\times 10^{-6}K^{-1}$) which allows the SOFC stacks to withstand rapid temperature cycling. Moreover the use of the ceramic electrolyte $Ce_{0.9}Gd_{0.1}O_{1.95}$ (CGO), enables the stack to be operated at temperatures around 500° C., which confers additional advantages associated with the arrangements for sealing the bi-polar plate manifolds, and reduced degradation of the stack components.

This approach seeks to ensure that the density of the deposited coating is high enough (55-60% theoretical density) to reduce the linear shrinkage to around 12-15%. By using electrophoretic deposition (EPD) followed by wet-bag isostatic pressing (100-500 MPa) it is possible to obtain dense impermeable films (5-20 microns thick) up to 5×5 cm size of CGO electrolytes on ferritic stainless steel foils (100 microns thick) by sintering in inert atmospheres (e.g. Argon) or controlled oxygen partial pressure atmospheres at temperatures around 1000° C. The advantages associated with using EPD (Ref 5) are that reasonably dense deposits 40-45% can initially be obtained in well defined patterns/arrays on the stainless steel. Moreover formation of the deposit does not require additions of organic binders and/or plasticizers which could be troublesome to remove completely when sintering in inert or reducing atmospheres. The EPD deposits/coatings are placed inside a wet-bag isostatic press and subjected to pressures in the range 100-500 Mpa. A final comment relates to the sintering of compacted CGO coatings on stainless steel. Earlier patents (Ref 6) and publications (Ref 7) have suggested that prior additions of (approximately 2 cation percent of) CoO, NiO, $Cu_2O$, etc to CGO are necessary to ensure the formation of dense (>96% theoretical density) samples of CGO when sintered at temperatures below 1000° C. However we have demonstrated that EPD deposition on ferritic stainless steel followed by isostatic pressing and sintering in an inert (argon) or controlled oxygen partial pressure atmosphere of a commercial CGO powder (Rhodia batch number 99004/98, $d_{50}$ (microns) 0.48, and surface area ($m^2/g$) 23) can produce a dense impermeable electrolyte film without the prior addition of a metal oxide. It is of course recognised that small amounts of iron, chromium, nickel can be transported into the CGO electrolyte during the sintering process from the stainless steel substrate and/or Ni (Cu)—CGO anodes. However the presence of selected transition metals in the sintered CGO film is a consequence of the sintering process and not the prior addition of a selected metal oxide. Examples are now provided of SOFC configurations which can be produced using the fabrication procedures described above in combination with photochemical maching (PCM) and laser machining procedures.

In a first example illustrated in FIG. 1 the formation of a dense thick film electrolyte is the initial fabrication procedure. Referring to FIG. 1 the following steps are performed:

Step 1A

Thick film CGO electrolyte deposited on top of 100 micron thick stainless steel foil by EPD. Deposit and substrate isostatically pressed at 300 MPa and then sintered in argon at 1000° C.

Step 1B

Metal in region 'a' is photochemically machined (PCM) to an appropriate pattern such as the grid design shown in plan 'b'. The porous grid structure provides support for the electrolyte film as well as the allowing access to the back of the electrolyte film. During the PCM process the exposed electrolyte film is protected by resist. The electrolyte/metal interface usually incorporates a thin $Cr_2O_3$ rich layer (~1 micron thick) formed during the sintering procedure. This layer can be perforated by laser ablation/drilling or ion beam milling to expose the back electrolyte film.

Step 1C

The final step is to load anode powder (e.g. NiO/CGO) into the perforated metal support (region 'a') using a powder slurry, and deposit cathode powder (e.g. $Gd_{0.6}Sr_{0.4}CoO_{3-x}$/CGO) on top of the electrolyte (region 'c') using, for example, screen printing. The complete assembly is then co-fired in the temperature range 700-800° C. to develop the microstructure and adhesion of the porous electrodes.

In a second embodiment illustrated in FIG. 2 an anode and dense thick film electrolyte are fabricated before a back etching procedure is provided. This technique proceeds in accordance with the following steps:

Step 2A

Recess (10-20 microns deep) formed into ferritic stainless steel foil by PCM.

Step 2B

Anode powder (e.g. NiO/CGO) deposited into recess by EPD. Anode sintered in reducing atmosphere at 1000° to reduce NiO and develop porous anode microstructure. Electrolyte powder (CGO) deposited on top of anode together with overlapping region on top of metal foil using EPD. After isopressing the dense thick film electrolyte fabricated by sintering in inert atmosphere (argon) at 1000° C.

Step 2C

Metal in region 'a' is photochemically machined (PCM) to an appropriate pattern such as the grid design shown in plan 'b'. The porous grid structure provides support for the anode and electrolyte film as well as allowing access to the back of the anode layer. During the PCM process the exposed electrolyte film is protected by resist. The anode/metal interface usually incorporates a thin $Cr_2O_3$ rich layer (~1 micron thick) formed during the sintering procedure. This layer can be perforated by laser ablation/drilling or ion beam milling to expose the back electrolyte film.

Step 2D

The final step in the fabrication of the SOFC structure is to deposit cathode powder (e.g. $Gd_{0.6}Sr_{0.4}CoO_3$/CGO) on the top surface of the electrolyte film by screen printing, followed by a firing process at 700-88° C. to develop the microstructure of the porous cathode and promote adhesion to the electrolyte.

As a third example all processing of a metal foil is completed before formation of the dense electrolyte film upon that foil. This technique proceeds by the following steps:

Step 3A

Metal foil double etched (PCM) to provide recess in top surface (region 'c') approx. 10 microns deep. Metal in region 'a' is photochemically machined (PCM) to an appropriate pattern such as the grid design shown in plan 'b'. This porous grid structure helps to stiffen the central strut which is typically 20-50 microns thick. If appropriate the recess 'c' can also be patterned (e.g. grid structure 'b').

Step 3B

Holes are next drilled into the central strut by laser drilling. Typical density of holes (10-20 microns diameter) that have found to be satisfactory and economical are in the range 300-600/cm$^2$. After laser drilling, the metal substrate can be annealed at 1000° C. in an inert atmosphere to remove stresses associated with the heat affected zones.

Step 3C

Anode powder (NiO/CGO) deposited into recess by EPD. Anode sintered in reducing atmosphere at 1000° C. to reduce NiO and develop porous anode microstructure. Electrolyte powder (CGO) deposited on top of anode together with overlapping region on top of metal foil using EPD. After isopressing the dense thick film electrolyte is fabricated by sintering in inert atmosphere (argon) or an appropriate oxygen partial pressure around 1000° C.

Step 3D

The final step in the fabrication of the SOFC structure is to deposit cathode powder (e.g. $Gd_{0.6}Sr_{0.4}CoO_3$/CGO) on the top surface of the electrolyte film by screen printing, followed by a firing process at 700-800° C. to develop the microstructure of the porous cathode and promote adhesion to the electrolyte.

After the SOFC structures have been fabricated the stainless steel foil is joined to the stainless steel bipolar plate by laser welding. This arrange provides both the electrical contact and seals the underlying gas distribution system incorporated into the stainless steel bi-polar plate.

REFERENCES

1. C. R. Aita and H-K. Kwok, J. Am, Ceram. Soc., 73, (1990), 3209
2. U. Pal and S. C. Singhal, J. Electrochemical Soc., 137, (1990), 2937
3. D. Holz, S. Wu, S. Scheppokat and N. Claussen, J. Am, Ceram. Soc., 77, (1994), 2509
4. D. Holz, S. Pagel, C. Bowen, S. Wu, and N. Claussen, J. European Ceramic Soc., 16, (1996), 255
5. O. O. Van der Biest, and L. J. Vanderperre, Ann. Rev. Mater. Sci., 29, (1999), 327
6. C. Kleinlogel, M. Goedickemeier, and L. Gauckler, European Patent, EP1,000,913 (18.05.2000)
7. C. Kleinlogel and L. J. Gauckler, P.255 in SOFC VI, Eds S. C. Singhal and M. Dockiya, Proc. Vol 99-19 (Electrochemical Society, New Jersey, USA 1999)

The invention claimed is:

1. A method of forming an impermeable sintered electrolyte ceramic layer of a solid oxide fuel cell, said method comprising the steps of:
    depositing a ceramic powder onto a stainless steel foil substrate using electrophoretic deposition to form a deposited ceramic powder layer;
    isostatically pressing said deposited ceramic layer to form a compressed ceramic powder layer; and
    heating said compressed ceramic powder layer to a temperature of less than 1100° C. to sinter said compressed ceramic powder to form said sintered ceramic layer upon said substrate.

2. A method as claimed in claim 1, wherein said substrate is ferritic stainless steel.

3. A method as claimed in claim 2, wherein said substrate is a ferritic stainless steel having European designation 1.4509.

4. A method as claimed in claim 1, wherein said step of heating heats said compressed ceramic powder layer to a temperature of less than 1000° C.

5. A method as claimed in claim 1, wherein said step of heating takes place in one of an inert atmosphere, and a controlled oxygen partial pressure atmosphere.

6. A method as claimed in claim 5, wherein said step of heating takes place in an Argon gas atmosphere, or a controlled oxygen partial pressure atmosphere.

7. A method as claimed in claim 1, wherein said step of isostatically pressing applies a pressure of between 100 and 500 MPa.

8. A method as claimed in claim 1, wherein said step of isostatically pressing uses a wet-bag isostatic press.

9. A method as claimed in claim 1, wherein said sintered ceramic layer is an electrolyte layer within said solid oxide fuel cell.

10. A method as claimed in claim 1, wherein said sintered ceramic layer is a CGO electrolyte layer.

11. A method as claimed in claim 10, wherein said sintered layer is a $Ce_{0.9}Gd_{0.1}O_{1.95}$ layer.

12. A method as claimed in claim 1, wherein said sintered ceramic layer and said substrate have a substantially equal coefficient of thermal expansion.

13. A solid oxide fuel cell including an impermeable sintered ceramic electrolyte layer formed in accordance with a method of claim 1.

14. A method as claimed in claim 1, wherein ceramic powder is substantially free from metal powder.

15. A method as claimed in claim 1, wherein said ceramic powder is substantially free from organic binders or plasticizers.

16. A method as claimed in claim 1, wherein said stainless steel foil substrate is a perforated stainless steel foil providing support for said sintered ceramic layer whilst allowing gas to flow through said stainless steel foil to said sintered ceramic layer.

17. A method as claimed in claim 1, which utilises a porous intermediate ceramic electrode layer.

18. A method as claimed in claim 17 wherein said step of depositing includes depositing said ceramic electrolyte powder onto said porous intermediate ceramic electrode layer on said stainless steel foil substrate together with an overlapping region onto said stainless steel foil substrate.

19. A method as claimed in claim 17, wherein said porous intermediate ceramic electrode layer is a ceramic anode layer.

20. A method as claimed in claim 19, wherein said porous intermediate ceramic anode layer is formed of NiO/CGO powder.

21. A method a claimed in claim 19, wherein said ceramic anode layer is sintered in a reducing atmosphere at below 1000° C.

22. A method as claimed in claim 1, wherein a porous intermediate ceramic electrode layer is formed on said sintered ceramic layer.

23. A method a claimed in claim 22, wherein said ceramic electrode layer is fired at between 700 and 800° C.

24. A method as claimed in claim 22, wherein said porous intermediate ceramic electrode layer is a ceramic cathode layer.

25. A method as claimed in claim 24, wherein said ceramic cathode layer is formed of $Gd_{1-x}Sr_xCoO_3$/CGO powder.

* * * * *